Patented June 22, 1937

2,084,970

UNITED STATES PATENT OFFICE 2,084,970

HALOGENATED ANTHRAQUINONE COMPOUNDS

William Dettwyler, Milwaukee, Wis., assignor to E. I. du Pont de Nemours & Company, Wilmington, Del., a corporation of Delaware No Drawing. Application May 24, 1935, Serial No. 23,253

5 Claims. (Cl. 260—60)

This invention relates to the preparation of new halogenated amino-anthraquinone compounds and has for its object the preparation of new tetrachloro-diamino-anthraquinones which are valuable intermediates for the preparation of dyestuffs.

According to this process, beta, beta-diamino-anthraquinones in which the beta groups are in opposite rings of the anthraquinone molecule are chlorinated preferably in hydrochloric acid in the presence of an oxidizing agent or with chlorine gas to produce tetrachloro-diamino-anthraquinones which may be used in the preparation of anthrimides, acridones, thiazoles, and other dyestuffs of the anthraquinone series.

To more fully illustrate my invention, the following examples are given, in which parts used are by weight.

Example 1

Suspend in a closed flask 100 parts of finely ground 2,6-diamino-anthraquinone in 1500 parts of 30% hydrochloric acid. The original brown mass turns gray as the hydrochloride is formed. When a uniform suspension is obtained, add gradually at 25–30° in small amounts 70 parts of sodium chlorate. The gray colored mass slowly turns to an orange as the chlorination proceeds. Finish the addition of the chlorate in about 3 to 4 hours and let stir at room temperature for 16 hours. Filter the orange mass and wash the cake with warm water until acid-free. Wash the cake with dilute soda ash solution, then with hot water until the filtrate is colorless. This soda ash wash will remove any oxidation product that may have been formed during the chlorination process.

The resulting 2,6-diamino-1,3,5,7-tetrachloro-anthraquinone is an orange to yellow-brown colored powder. It is soluble in 96% sulfuric acid with a brown color, slightly soluble in nitrobenzene. It can be obtained in crystalline form when boiled for half an hour in 10 parts of nitrobenzene. It contains 37–38% chlorine.

Example 2

Suspend 50 parts of 2,6-diamino-anthraquinone in 750 parts of hydrochloric acid (20%), and pass in chlorine gas until an increase of 60 parts in weight is obtained. Filter and wash acid free and extract the cake with dilute soda ash solution at 70–80° C. Filter and wash until the filtrate is colorless. The product is identical with the one obtained in Example 1.

Example 3

Add to a suspension of 50 parts of 2,7-diamino-anthraquinone in 750 parts of 30% hydrochloric acid, 50 parts of sodium acetate crystals, and add at 25–30° C., 35 parts of sodium chlorate over a period of 3 to 4 hours. Then stir at room temperature for 16 hours, filter and wash. The resulting 1,3,6,8-tetrachloro-2,7-diamino-anthraquinone contains 37% chlorine. It is a red-brown powder, soluble in concentrated sulfuric acid with a brown color, slightly soluble in nitrobenzene with a yellow color.

The concentration of the hydrochloric acid used in this halogenation procedure may vary from 15 to 32% without impairing the final result. In place of sodium acetate, an equivalent amount of acetic acid may be used. Chlorination may be effected by the addition of chlorine to the hydrochloric acid suspension or by the oxidation of some of the hydrochloric acid, as illustrated in the above examples. It is preferred to carry out the chlorination at temperatures from 25–30° C., although this temperature may be varied within reasonable limits. At too high a temperature, however, side reactions will take place which will lower the yield of the chlorination product. Potassium chlorate may be used in place of sodium chlorate.

I claim:

1. A compound of the formula

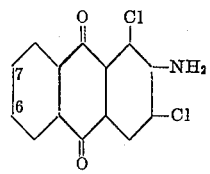

which contains an amino group in one of the positions 6 and 7 and in which both positions ortho to such amino group contain a chlorine atom.

2. 2,6-diamino-1,3,5,7-tetrachloro-anthraquinone.

3. 2,7-diamino-1,3,6,8-tetrachloro-anthraquinone.

4. The process which comprises reacting beta, beta-diamino-anthraquinone, in which the amine groups are in opposite rings of the anthraquinone molecule, with chlorine while the anthraquinone compound is suspended in a hydrochloric acid solution of from 15 to 32% acid concentration.

5. The process which comprises reacting beta, beta-diamino-anthraquinone, in which the amine groups are in opposite rings of the anthraquinone molecule, with chlorine while the anthraquinone compound is suspended in a hydrochloric acid solution of from 15 to 32% acid concentration, chlorination being effected in the presence of acetic acid.

WILLIAM DETTWYLER.